(12) United States Patent
Chicharro González

(10) Patent No.: US 7,331,547 B2
(45) Date of Patent: Feb. 19, 2008

(54) DEVICE FOR FACILITATING THE LOWERING OF A LANDING GEAR BY GRAVITY

(75) Inventor: José Luis Chicharro González, Madrid (ES)

(73) Assignee: Airbus Espana, S.L., Madrid (ES)

(*) Notice: Subject to any disclaimer, the term of this patent is extended or adjusted under 35 U.S.C. 154(b) by 62 days.

(21) Appl. No.: 11/323,084

(22) Filed: Dec. 30, 2005

(65) Prior Publication Data
US 2006/0144998 A1    Jul. 6, 2006

(30) Foreign Application Priority Data
Dec. 31, 2004   (ES) ................. 200500026

(51) Int. Cl.
*B64C 1/14*   (2006.01)
*B64C 25/10*  (2006.01)
*B64C 25/14*  (2006.01)

(52) U.S. Cl. ............... 244/129.5; 244/129.4; 244/100 R; 244/102 R

(58) Field of Classification Search ............ 244/100 R, 244/102 R, 102 A, 102 SL, 102 SS, 129.4, 244/129.5
See application file for complete search history.

(56) References Cited

U.S. PATENT DOCUMENTS

| 2,538,878 | A * | 1/1951 | Misulis ............. 244/102 R |
| 4,568,045 | A * | 2/1986 | Mayer ............... 244/102 R |
| 4,787,577 | A * | 11/1988 | Whittle ............. 244/129.4 |
| 6,352,221 | B1 * | 3/2002 | Sakurai ............ 244/102 R |
| 7,178,759 | B2 * | 2/2007 | Rouyre ............. 244/129.5 |
| 2005/0103937 | A1 * | 5/2005 | Braincourt ........ 244/129.5 |

* cited by examiner

Primary Examiner—Teri Pham Luu
Assistant Examiner—Joshua Michener
(74) Attorney, Agent, or Firm—Klauber & Jackson L.L.C.

(57) ABSTRACT

Device for facilitating the lowering of a landing gear by gravity, comprising at least on roller device (4) positioned on at least one closing panel (2) of the hatch for the landing gear in a contact area with the tire (1a) of the landing gear of an aircraft (7) on initiating its descent, the roller device (4) comprising a rigid roller device which can rotate freely about its axis (4a), and being positioned such that its axis is perpendicular to the path of the tire (1a) so that the tire will make the roller device (4) turn without sliding over it.

5 Claims, 5 Drawing Sheets

DEVICE FOR FACILITATING THE LOWERING OF A LANDING GEAR BY GRAVITY

RELATED APPLICATION

The present application claims priority from Spanish Application Serial No. 200500026, filed on Dec. 31, 2004. Applicants claim priority under 35 U.S.C. §119 as to said Spanish application, the entire disclosure of which is incorporated herein by reference in its entirety.

TECHNICAL FIELD OF THE INVENTION

The present invention is encompassed within the technical field of aircraft landing gear actuator systems, particularly in the actuator systems in which, the landing gear, when being lowered, must open the hatch which closes the landing gear well inside in which the landing gear is housed in its folded position.

PRIOR ART TO THE INVENTION

On lowering a landing gear by gravity, it must be achieved that said landing gear unfolds until reaching its locked extended position, for which purpose it must push the hatch that closes the landing gear well is open enough to allow the landing gear to emerge from the landing gear well. Such an extension by gravity of the landing gear is a requirement particularly necessary and even absolutely mandatory in cases of emergency in which the landing gear actuator mechanism has ceased functioning and the landing gear must therefore reach its locked extended position solely by gravity.

Conventional hatches are provided with at least a first hatch door comprising at least a closing panel, an articulation axis by which a first side of the first hatch door is rotatably articulated to a structural element of the aircraft so as to swing a from a closed position in which the first hatch door closes at least a first portion of the hatch, towards an open position in which the landing gear is in said extended position, said structural element being located in the vicinity of an edge of the hatch.

The hatch door comprises a first contact area at which at least a tire a of first wheel of the landing gear contacts the hatch door when descending along said descending path towards said extended position such that said first wheel pushes the hatch door to swing towards said open position, the first wheel having a spinning axis.

The only forces which in these cases normally act on the hatch door are: gravity, the resistance opposed by the actuator against opening the hatch door, the aerodynamic loads and the contact and friction forces introduced by the landing gear. In any case, the resulting force must be such as to cause the hatch to become opened. Depending upon the geometry and kinematics of the hatch door and landing gear, there may be the case that the normal component of the force of contact will aid to opening the hatch door, but the friction component works in the opposite sense. In this case, it is advisable to minimize the friction component, which is achieved by reducing the friction coefficient.

In order to make it possible to start the lowering of the landing gear, in some cases ramp-like-arranged metal sheets or bars have been used over which the landing gear tire may slide. Due to that the surface of the tire is a high friction surface, this entails the drawback that it is necessary to enable sliding of the tire by means of sliding coatings on the surface of the metal sheet over which the landing gear slides or on the inside of the hatch panel itself. These coatings, apart from not ensuring total sliding, entail the added drawback of requiring continuous maintenance. They are therefore no satisfactory solution.

DESCRIPTION OF THE INVENTION

It is an object of the present invention to overcome the aforementioned drawbacks of prior art mechanisms by means of a device for facilitating the lowering of a landing gear of an aircraft by gravity along a descending path through a hatch of the above-described type, from a retracted position in which the landing gear is positioned in a landing gear well, towards an extended position in which the landing gear protrudes through the hatch, wherein at least a first roller device is positioned in said first contact area at said closing panel, the first roller device comprising a roller of a rigid material and being freely rotatable about a first rotation axis; said first rotation axis being transversal to said descending path of the landing gear, the first roller device comprising a roller being positioned such that said tire of said first wheel, when contacting said roller, causes the roller to rotate about said first rotation axis without sliding on the roller when pushing the hatch door towards said open position.

In a first embodiment of the invention, the first articulation axis of the hatch door and said first rotating axis of the roller are coaxial with a longitudinal axis of the aircraft, such that said first rotating axis is perpendicular to said spinning axis of said first wheel.

In a second embodiment of the invention, the first articulation axis of the hatch door and said first rotating axis of the roller are perpendicular to the longitudinal axis of the aircraft, such that said first rotating axis is parallel to said spinning axis of said first wheel. In this second embodiment, said edge of the hatch may be a rearward edge or a forward edge.

As readily apparent, the device of the present invention allows that, when the tire of the landing gear pushes against the hatch door, it does not contact the structure of the hatch door directly, but contacts the roller device as a result of which the associated friction is that of the bearings inside the roller device and not that of the tire rubber against the hatch door or the against ramp material or bars. The device of the present invention therefore solves the aforementioned drawbacks of prior art in a simple and effective manner.

BRIEF DESCRIPTION OF THE FIGURES

A description is provided in following of aspects and embodiments of the invention in with reference to some drawings which comprise an integral part of this descriptive account. In these drawings.

Figure 1:
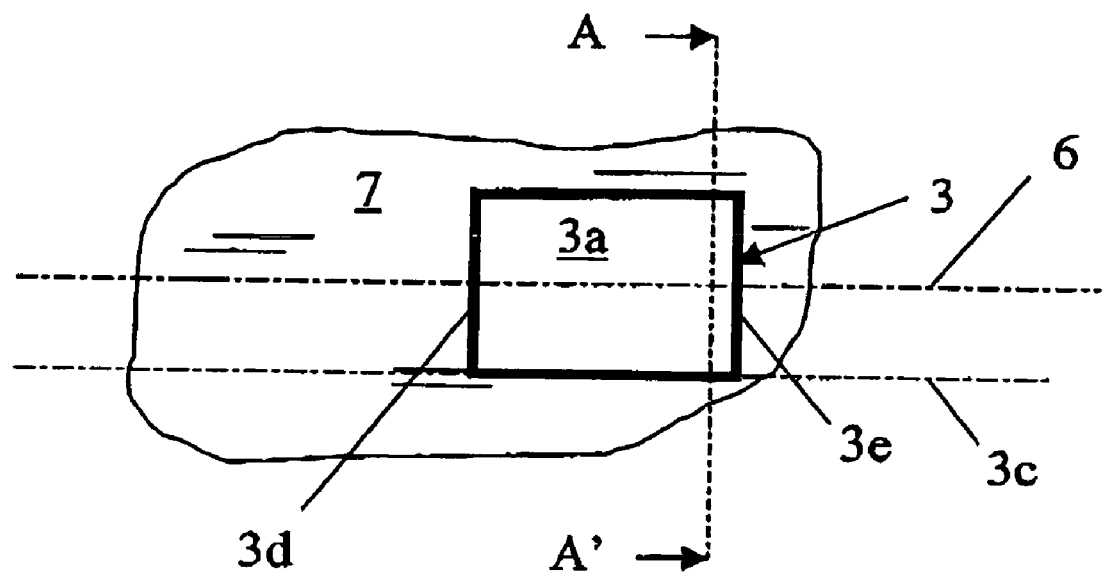
FIG. 1 is a schematic bottom plan view showing the location of a first type of landing gear hatch.

Numerical references are provided in these figures identifying the following elements:
1 landing gear
1a landing gear wheel
1b landing gear wheel tire
1c first arm of landing gear
1d second arm of landing gear
1e spinning axis of first wheel
1f tilting axis for landing gear
1g articulation between first and second landing gear arm
2 landing gear well
3 hatch
3a hatch door
3b closing panel of hatch door
3c articulation axis of hatch door
3d hatch rearward edge
3e hatch forward edge
4 first roller device
4a rotation axis of first roller device
4b roller device support
4c roller
4d roller axle
4e roller bearings
4f first side plate members
4g second side plate members
4h bottom plate members
4i rear plate member
5 structural element of the aircraft
6 longitudinal axis of the aircraft
7 aircraft

EMBODIMENTS OF THE INVENTION

Figure 2:
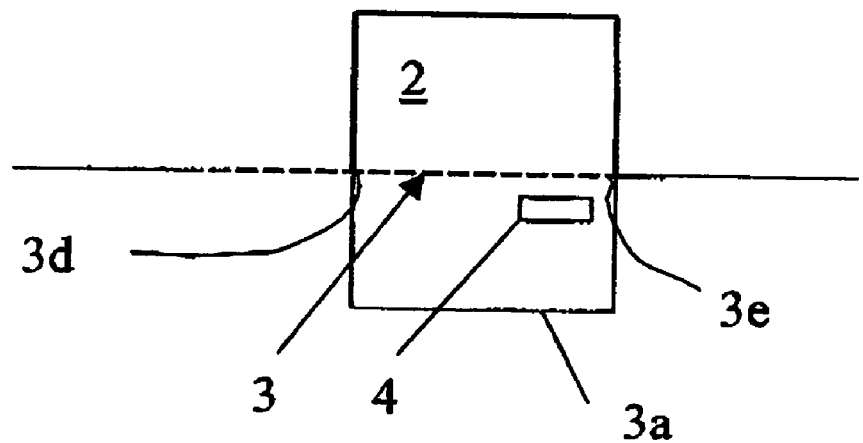
FIG. 2 is a schematic sectional view along line 6 shown in FIG. 1, with the hatch door in an open position.

The first type of landing gear hatch 3 shown in FIGS. 1 and 2 is located in the belly fairing of an aircraft 7. The hatch 3 is the access opening to the landing gear well 2 and comprises a hatch door 3a that closes the hatch 3. The hatch door is articulated through an articulation axis 3c to a structural element (not shown in FIGS. 1 and 2) of the aircraft 7, such that the hatch door 3a, when opening, swings perpendicularly to said longitudinal axis 6 towards its open position. The hatch 3 is located along a longitudinal axis 6 of the aircraft 7 and has a rearward edge 7d and a forward edge 7e. In accordance with the invention, a roller device 4 is positioned on the hatch door 3a coaxially with said longitudinal axis 6 in the vicinity of the articulation axis 3c and near the forward edge 3e of the hatch 3.

In the second type of landing gear hatch 3, the hatch door 3a is articulated through an articulation axis 3c to the rearward edge to a structural element (not shown in FIGS. 3 and 4) of the aircraft 7, such that the hatch door 3a, when opening, swings coaxially to said longitudinal axis 6 towards its open position. In accordance with the invention, a roller device 4 is positioned on the hatch door 3a coaxially with and in the vicinity of the articulation axis 3c. This second type of hatch is typically used for the head landing gear of an aircraft.

Figure 5:
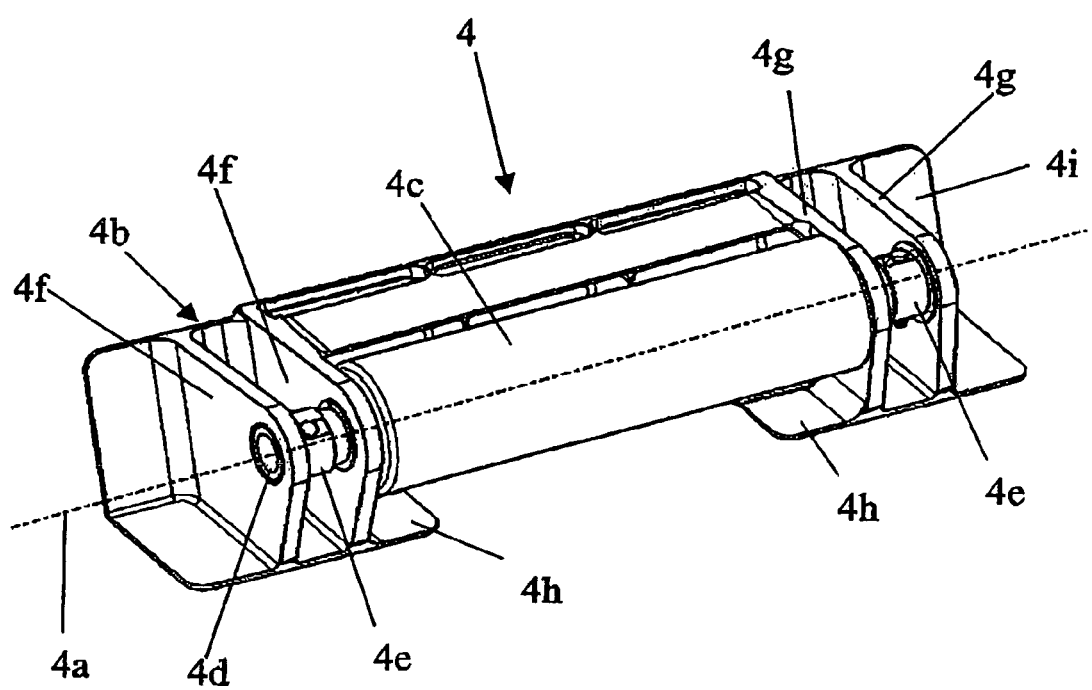
FIG. 5 is a schematic perspective front view of an embodiment of a roller device and a roller device support according to the invention.

As shown in FIG. 5, the roller device 4 comprises a support 4b, a rotating axle 4d which constitutes the rotation axis 4a for a roller 4c. The support 4b comprises a rear plate member 4i, bottom plate members 4h linked to the rear plate member 4i, first side plate members 4f and second side plate members 4g. The axle 4d rotates in roller bearings 4e that are arranged respectively in the first and second side plate members 4f, 4g. The support can be fixed to a reinforcing element (not shown) or to the closing panel of the hatch door 3a.

Figure 6:
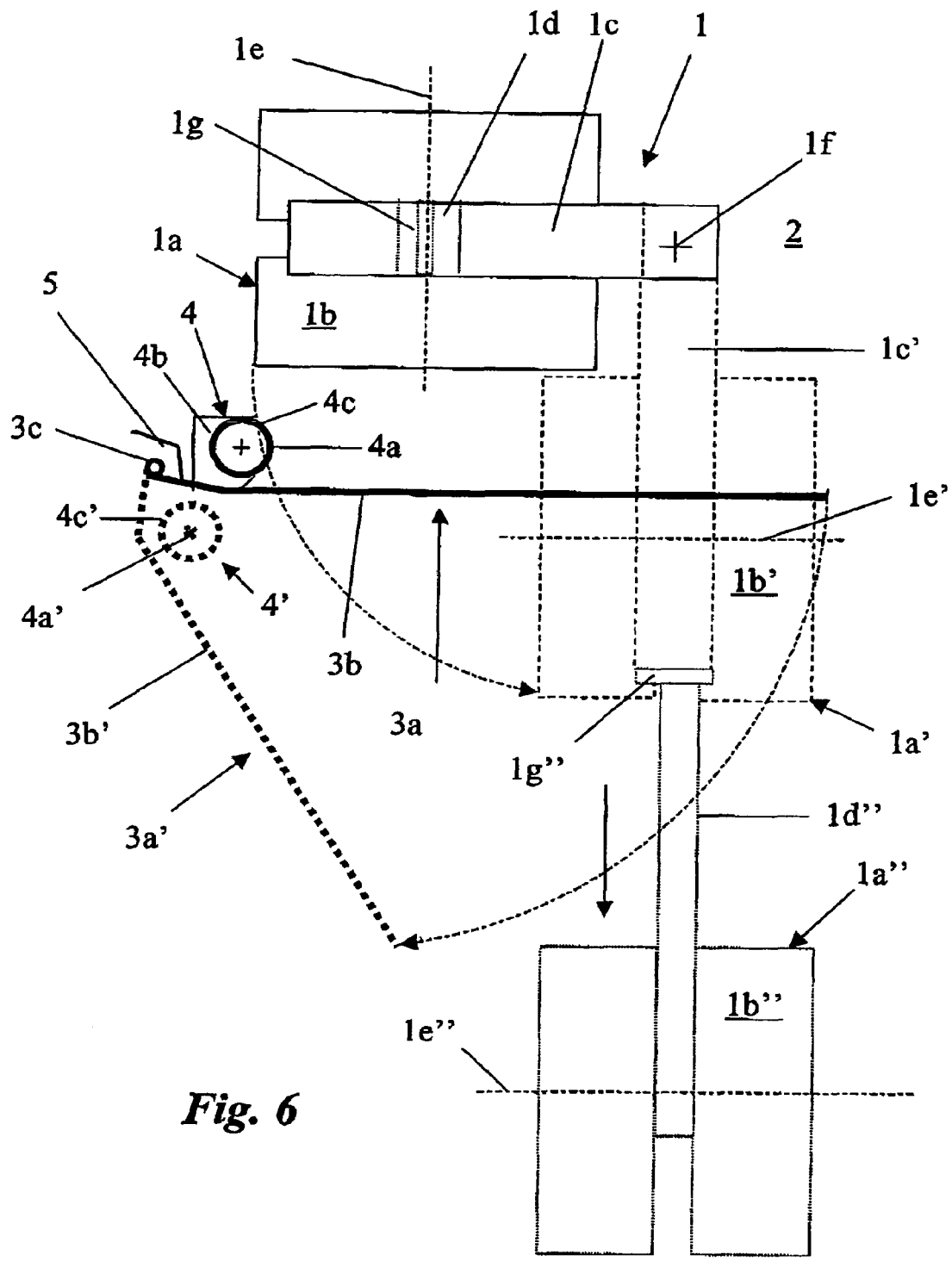
FIG. 6 is a schematic sectional view along line A-A' in FIG. 1 showing a first embodiment of the device of the present invention when applied to a first kind of landing gear and hatch.

FIG. 6, which refers to the device of the present invention applied to a hatch of the type shown in FIGS. 1 and 2, illustrates a first type of a per se conventional landing gear 1 comprising a first arm 1c and a second arm 1d that are articulated to each other such that they can rotate with respect each other about an articulation axis 1g. The first arm 1c is conventionally articulated to the structure (not shown) of the aircraft so that it may swing about tilting axis 1f. Two wheels with rubber tires including a first wheel 1a with a rubber tire 1b are arranged at the free end of the second arm 1d. The wheels are capable of rotating about a spinning axis 1e.

The hatch is provided with a hatch door 3a comprising a closing panel 3b and an articulation axis 3c by which the hatch door 3a is rotatably articulated to a structural element 5 of the aircraft located in the vicinity of an edge of the hatch. Thereby, the hatch door 3a is able to swing from a closed position in which it closes the hatch, towards an open position which is shown in dotted lines in which the hatch door and the closing panel are identified as 3a' and 3b', respectively.

In its resting retracted position, the landing gear 1 is located in landing gear well 2. In this retracted position, the first arm 1c is in a substantially horizontal position and extends perpendicularly to the longitudinal axis 6 shown in FIG. 1 so that the spinning axis 1e of the wheels 1a is substantially vertical, whilst the second arm 1d extends backwards towards the rear edge 3d of the hatch.

Upon descending towards its extended position, the landing gear 1 first adopts an intermediate position in which the first arm 1c swings downwards (in the direction of the descending path shown by the dotted curved arrow in FIG. 6) about the tilting axis 1f such that the spinning axis 1e of the wheels becomes horizontal whilst the second arm still remains in its initial backwardly retracted position. The intermediate position is shown in dotted lines and the positions of the first arm, the first wheel and the spinning axis of the wheels are identified as 1c', 1a', 1e', respectively.

When further descending from the intermediate position to the final extended position in the direction of the straight arrow in FIG. 6, the second arm unfolds forwards and downwards until reaching said extended position (also shown in dotted lines) in which the positions of the first arm, the second arm, the articulation axis between the first and second arm, the first wheel, the tire, and the spinning axis of the wheels are identified respectively as 1c", 1d", 1g", 1a", 1b", 1e".

The same as in FIG. 2, a roller device 4 is positioned on the hatch door 3a coaxially with the longitudinal axis 6 of the aircraft in the vicinity of the articulation axis 3c and near the forward edge 3e of the hatch 3. Specifically, the roller device 4 positioned is positioned at said closing panel 2.

The roller device 4 is that shown in FIG. 5 and thus comprises a roller of a rigid material and being freely rotatable about a rotation axis 4a. The rotation axis 4a is transversal to the descending path of the landing gear 1, specifically in the embodiment shown, to the descending path of the first arm 4c thereof.

As apparent, the roller device 4 is positioned such that the tire 1b of the first wheel, upon descending, abuts against the roller thus exerting a force against the closing panel, and therefore causes the roller to rotate about rotation axis 4a. Therefore, the tire 1b does not slide on the roller when pushing the hatch door panel 3b and thus hatch door 3a to swing towards the open position of the hatch door 3a. The open position of the hatch is shown in dotted lines and the positions of the hatch door, the closing panel, the roller device and the rotating axis of the roller in that open position are marked as 3a', respectively.

Figure 3:
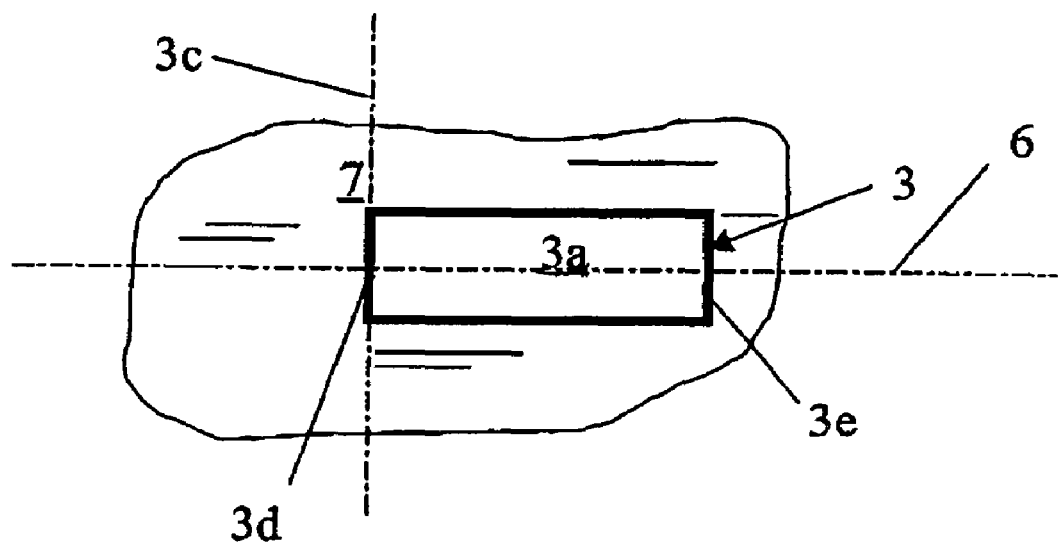
FIG. 3 is a schematic bottom plan view showing the location of a second type of a landing gear hatch.
Figure 4:
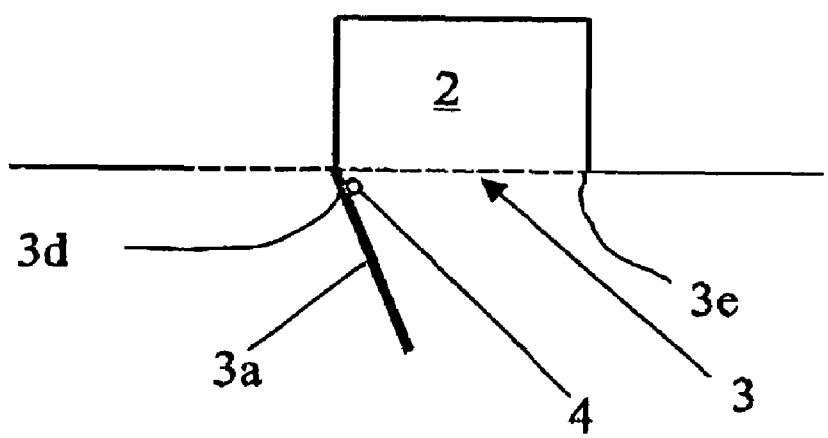
FIG. 4 is a schematic sectional view along line 6 shown in FIG. 2, with the hatch door in an open position.
Figure 7:
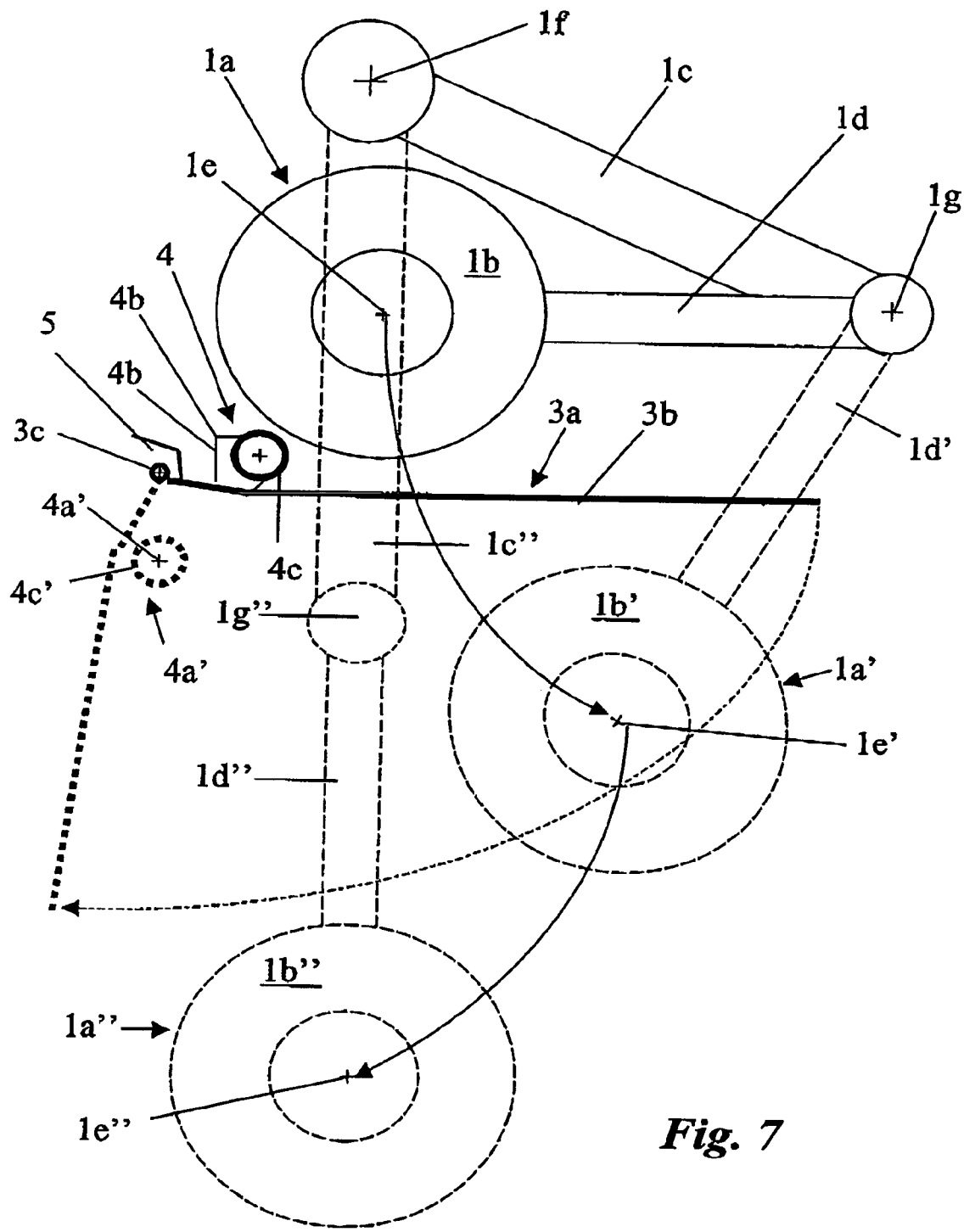
FIG. 7 is a schematic sectional view along line 6 in FIG. 3 showing a second embodiment of the device of the present invention when applied to a second kind of landing gear and hatch door.

FIG. 7, shows the device of the present invention applied to a hatch and hatch well of the type shown in FIGS. 3 and 4, in which the first articulation axis of the hatch door 3a and the rotating axis 4a of the roller 4c are perpendicular to the longitudinal axis 6 of the aircraft such that said rotating axis 4a is parallel to said spinning axis 1e of said first wheel 1a.

The landing gear shown in FIG. 7 comprises a first arm 1c and a second arm 1d that are articulated to each other such that they can rotate with respect each other about an articulation axis 1g. The first arm 1c is conventionally articulated to the structure (not shown) of the aircraft so that it may swing about tilting axis 1f. Two wheels with rubber tires including a first wheel 1a with a rubber tire 1b are arranged at the free end of the second arm 1d. The wheels are capable of rotating about a spinning axis 1e.

In its resting retracted position, the second type of a per se conventional landing gear 1 shown in FIG. 7 is located in landing gear well 2 and its first arm 1c is in a substantially horizontal position and extends perpendicularly to the longitudinal axis 6 shown in FIG. 3 so that the spinning axis 1e of the wheels 1a is substantially horizontal and coaxial with the said longitudinal axis. The second arm 1d extends in a plane that is substantially coplanar with the first arm 1c towards a side portion of the hatch well.

Upon descending towards its extended position, the landing gear 1 first adopts an intermediate position in which the first arm 1c swings downwards (in the direction of the descending path shown by the dotted curved arrow in FIG. 7) about tilting axis 1f whilst the second arm still remains in its initial position. The intermediate position is shown in dotted lines and the positions of the first arm, the first wheel and the spinning axis of the wheels are identified as 1c', 1a', 1e', respectively.

When further descending from the intermediate position to the final extended position in the direction of the straight arrow in FIG. 7, the second arm descends until reaching the extended position (also shown in dotted lines) in which the positions of the first arm, the second arm, the articulation axis between the first and second arm, the first wheel, the tire, and the spinning axis of the wheels are identified respectively as 1c'', 1d'', 1g'', 1a'', 1b'', 1e''.

The same as in FIG. 3, a roller device 4 is positioned at said closing panel 2 of the hatch door 3a perpendicularly to the longitudinal axis 6 of the aircraft in the vicinity of the articulation axis 3c and near the rearward edge 3e of the hatch 3.

The roller device 4 is that shown in FIG. 5 and thus comprises a roller of a rigid material and is freely rotatable about a rotation axis 4a. The rotation axis 4a is transversal to the descending path of the landing gear 1.

As apparent, the roller device 4 is positioned such that the tire 1b of the first wheel, upon descending, abuts against the roller thus exerting a force against the closing panel, and therefore causes the roller to rotate about rotation axis 4a. Therefore, the tire 1b does not slide on the roller when pushing the hatch door panel 3b and thus hatch door 3a to swing towards the open position of the hatch door 3a. The open position of the hatch is shown in dotted lines and the positions of the hatch door, the closing panel, the roller device and the rotating axis of the roller in that open position are marked as 3a', respectively.

From the above described embodiments shown it becomes apparent that by using the roller device of the present invention makes it possible that the rubber tire 1b of the wheel 1a may, when pushing against the roller device and thus exerting a force causing the hatch door 3a to open, descends without having to overcome friction forces, whereby accidental blockage of the descent of the landing gear 1 is substantially avoided.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. Device for facilitating the lowering of a landing gear of an aircraft by gravity along a descending path through a hatch, from a retracted position in which the landing gear is positioned in a landing gear well, towards an extended position in which the landing gear protrudes through the hatch,
the hatch being provided with at least a first hatch door comprising at least one closing panel, an articulation axis by which a first side of the first hatch door is rotatably articulated to a structural element of the aircraft so as to swing from a closed position in which the first hatch door closes at least a first portion of the hatch, towards an open position in which the landing gear is in said extended position, said structural element being located in the vicinity of an edge of the hatch;
the hatch door comprises a first contact area at which at least a tire a of first wheel of the landing gear contacts the hatch door when descending along said descending path towards said extended position such that said first wheel pushes the hatch door to swing towards said open position; said first wheel having a spinning axis;
wherein the device comprises
at least a first roller device positioned in said first contact area at said closing panel, the first roller device comprising a roller made of a rigid material and being freely rotatable about a first rotation axis; said first rotation axis being transversal to said descending path of the landing gear, the roller being positioned such that said tire of said first wheel, when contacting said roller, causes the roller to rotate about said first rotation axis without sliding on the roller when pushing the hatch door towards said open position.

2. Device according to claim 1, wherein said first articulation axis of the hatch door and said first rotating axis of the roller are coaxial with a longitudinal axis of the aircraft, such that said first rotating axis is perpendicular to said spinning axis of said first wheel.

3. Device according to claim 1, wherein said first articulation axis of the hatch door and said first rotating axis of the roller are perpendicular to a longitudinal axis of the aircraft, such that said first rotating axis is parallel to said spinning axis of said first wheel.

4. Device according to claim 3, wherein said edge of the hatch is a rearward edge.

5. Device according to claim 3, wherein said edge of the hatch is a forward edge.

* * * * *